US011731714B2

(12) United States Patent
Pelissier et al.

(10) Patent No.: US 11,731,714 B2
(45) Date of Patent: Aug. 22, 2023

(54) TRACK SYSTEM FOR VEHICLE

(71) Applicant: SOUCY INTERNATIONAL INC., Drummondville (CA)

(72) Inventors: Jacob Pelissier, Drummondville (CA); Remi Hamelin, Trois-Rivieres (CA); Olivier Dumoulin, Drummondville (CA); Tommy Marcotte, St-Cyrille de Wendover (CA); Romeo Lussier, Sherbrooke (CA); Marc-Antoine Leblanc, Drummondville (CA)

(73) Assignee: SOUCY INTERNATIONAL INC., Drummondville (CA)

( * ) Notice: Subject to any disclaimer, the term of this patent is extended or adjusted under 35 U.S.C. 154(b) by 602 days.

(21) Appl. No.: 16/644,668

(22) PCT Filed: Sep. 5, 2018

(86) PCT No.: PCT/US2018/049628
§ 371 (c)(1),
(2) Date: Mar. 5, 2020

(87) PCT Pub. No.: WO2019/051003
PCT Pub. Date: Mar. 14, 2019

(65) Prior Publication Data
US 2021/0107576 A1    Apr. 15, 2021

Related U.S. Application Data

(60) Provisional application No. 62/554,077, filed on Sep. 5, 2017.

(51) Int. Cl.
*B62D 55/12* (2006.01)
*B62D 55/135* (2006.01)
(Continued)

(52) U.S. Cl.
CPC .......... *B62D 55/12* (2013.01); *B62D 55/135* (2013.01); *B62D 55/084* (2013.01); *B62D 55/125* (2013.01)

(58) Field of Classification Search
CPC .............................. B62D 55/12; B62D 55/135
See application file for complete search history.

(56) References Cited

U.S. PATENT DOCUMENTS 4,034,618 A    7/1977  Groff et al.
5,352,029 A *  10/1994 Nagorcka .............. B62D 55/24
                                                      305/179
(Continued)

FOREIGN PATENT DOCUMENTS

WO      199107306 A1     5/1991
WO      WO-9311022 A1 *  6/1993 ............. B62D 55/12
WO      2011154533 A1   12/2011

OTHER PUBLICATIONS

International search Report from PCT/US2018/049628; Lee W. Young; dated Nov. 15, 2018.
(Continued)

*Primary Examiner* — Kevin Hurley
(74) *Attorney, Agent, or Firm* — BCF LLP

(57) ABSTRACT

A track system for a vehicle, the vehicle having a drive axle, the track system comprising a drive sprocket including a hub structured to be connected to the drive axle, a plurality of teeth radially outward of the hub, a rim at least indirectly attached to the hub, the rim including: a body, a body outer surface, a recess in the rim body inward of the body outer surface, a resiliently deformable ring disposed in the recess, the ring structured and arranged with respect to the body so as to be less rigid than the body, a resiliently deformable tread extending outwardly of the rim-outer surface, the tread connected to the ring, a resiliently deformable track dis-
(Continued)

posed around the drive sprocket, the track having a track-inner surface in contact with the tread.

17 Claims, 14 Drawing Sheets

(51) Int. Cl.
*B62D 55/084* (2006.01)
*B62D 55/125* (2006.01)

(56) References Cited

U.S. PATENT DOCUMENTS

| | | |
|---|---|---|
| 7,252,348 B2 | 8/2007 | Gingras |
| 9,315,225 B2 * | 4/2016 | St-Pierre ................ B62D 55/24 |
| 2010/0276990 A1 | 11/2010 | Zuchoski et al. |
| 2011/0048817 A1 | 3/2011 | Bessette et al. |
| 2012/0001478 A1 | 1/2012 | Zuchoski et al. |
| 2015/0042153 A1 * | 2/2015 | Lussier ................ B62D 55/244 |
| | | 305/184 |
| 2017/0113742 A1 | 4/2017 | Tratta et al. |

OTHER PUBLICATIONS

Supplementary European Search Report from EP18853083; dated Apr. 14, 2021; Burley, James.

* cited by examiner

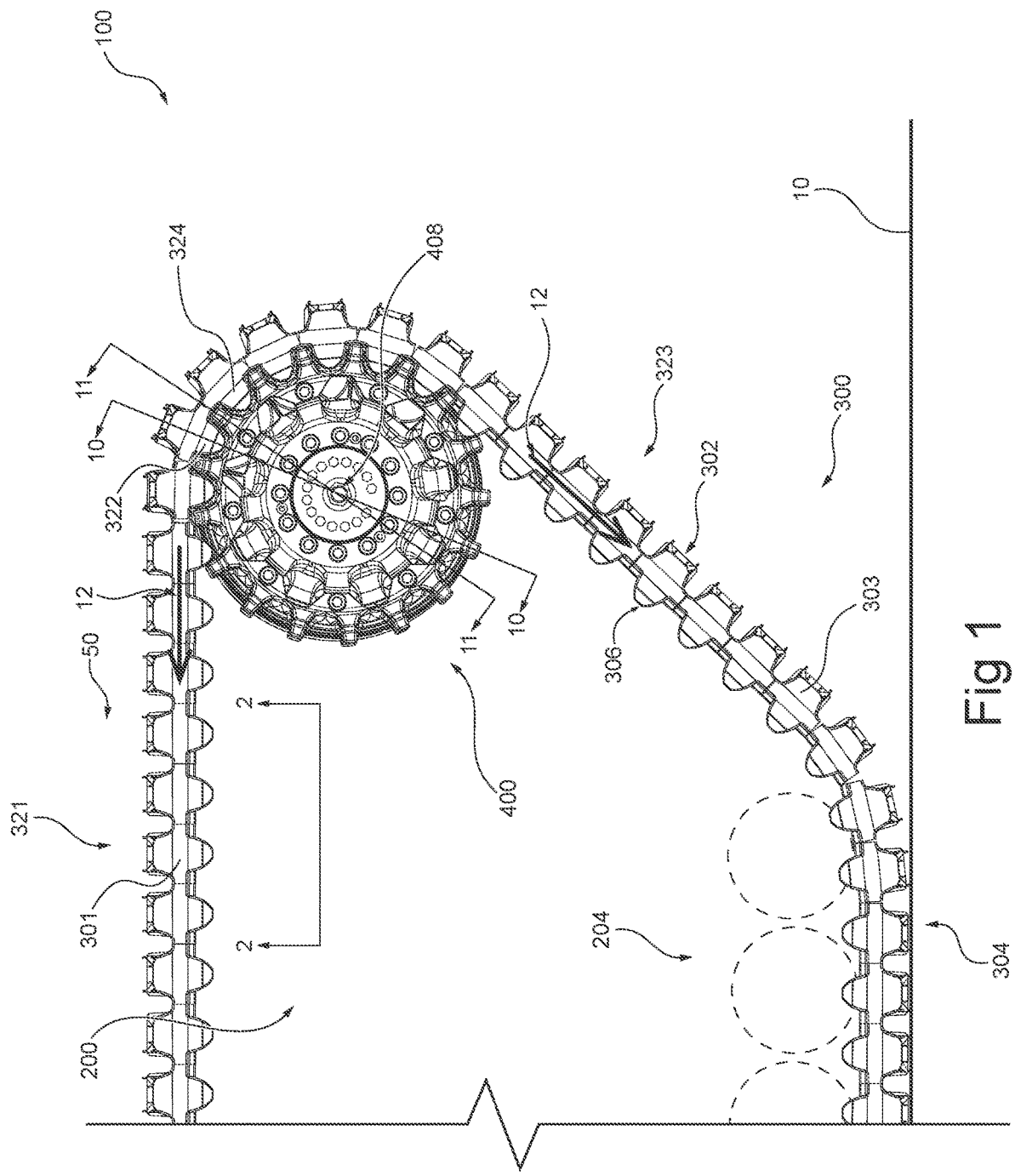

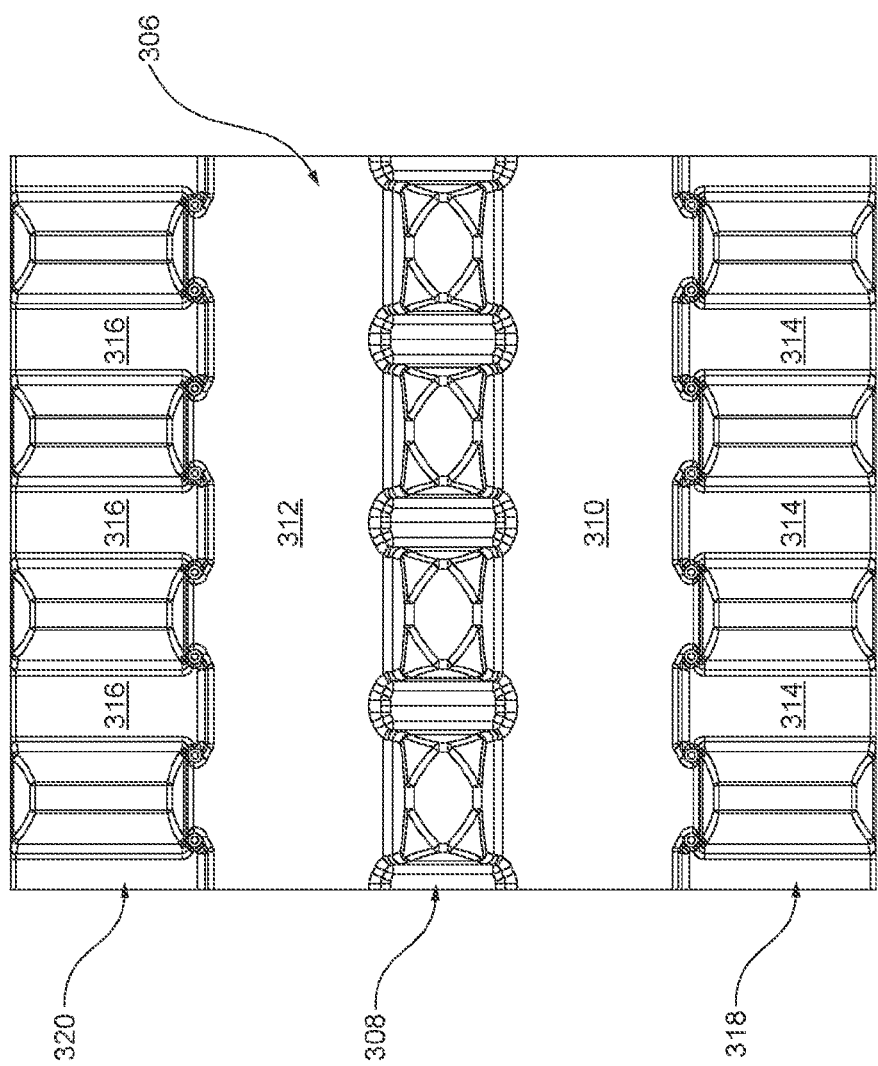

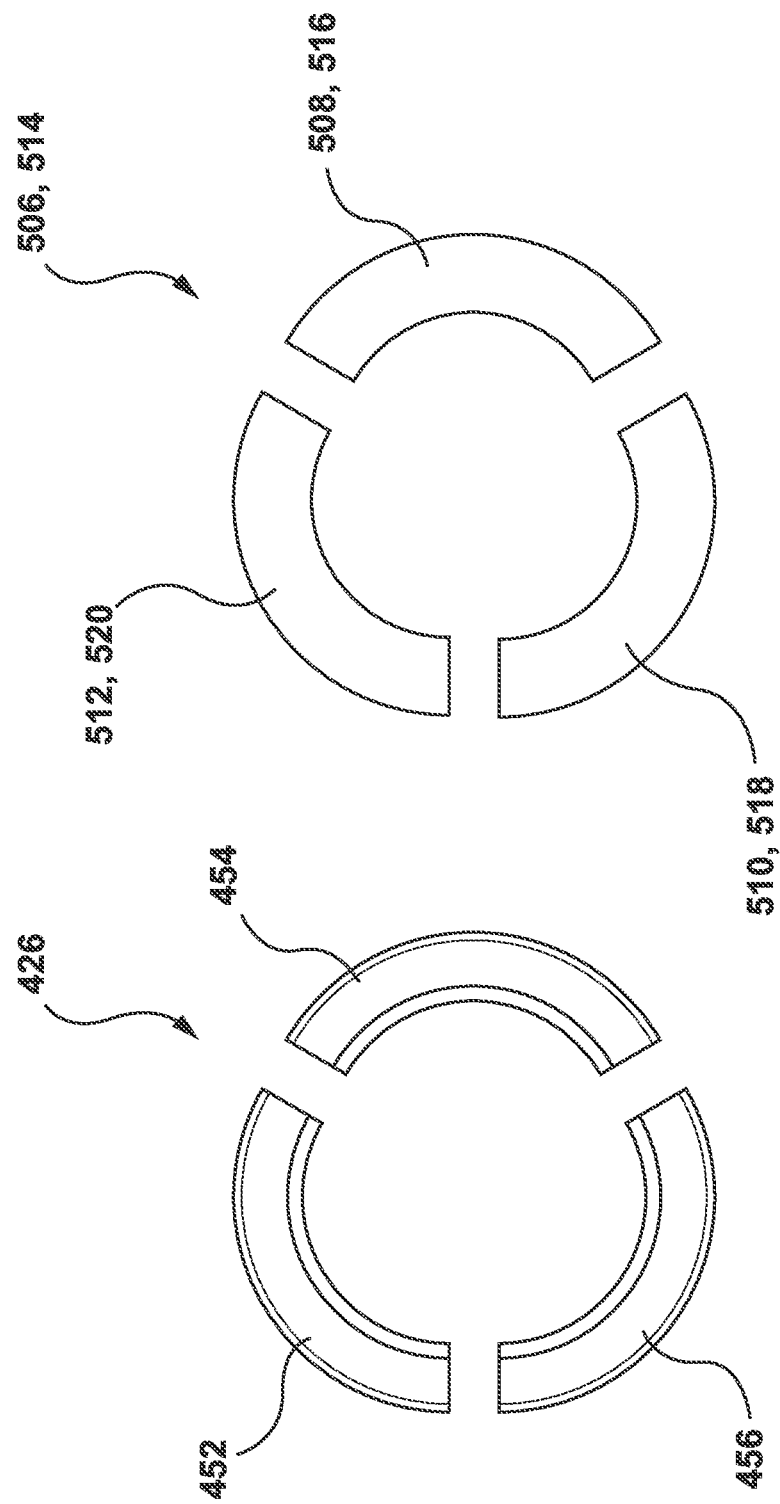

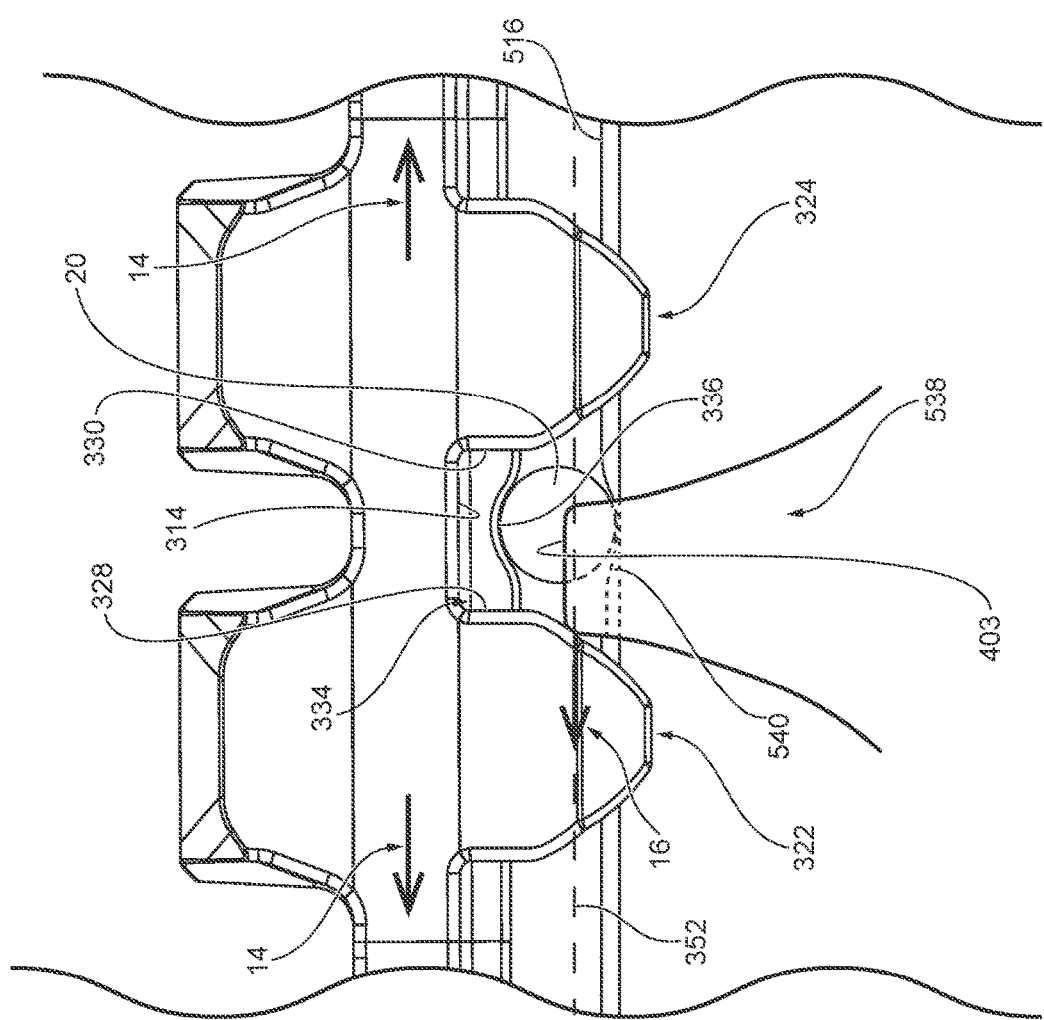

TRACK SYSTEM FOR VEHICLE

CROSS-REFERENCE

The present application claims priority to U.S. Provisional Patent Application No. 62/554,077, filed Sep. 5, 2017, entitled "Sprocket", which is incorporated herein by reference it its entirety.

TECHNICAL FIELD

The present invention relates to a track system for a vehicle.

BACKGROUND

Certain vehicle types, such as, for example, industrial vehicles (e.g., harvesters, tractors, bulldozers, loaders etc.), military vehicles (e.g., tanks, carriers, etc.) and off-road vehicles (e.g., all terrain vehicles, utility task vehicles, etc.) are used to operate over ground surfaces that are soft, slippery and/or uneven (e.g., soil, mud, sand, rocks, debris, ice, snow, etc.).

Conventionally, such vehicles have had large wheels equipped with ground-contacting tires. Under certain conditions, such tires may provide insufficient traction when such vehicles operate on some ground surfaces and, as these vehicles are generally heavy, the ground surface may yield under the pressure exerted by the tires, as the weight of the vehicles is concentrated onto small areas.

In order to reduce the aforementioned drawbacks, to increase traction and to enhance stability of the vehicles, track systems were developed to be used in place of at least some of the tire-equipped wheels typically used on such vehicles.

Generally, track systems comprise a support frame, a drive assembly, idler wheel(s) and rollers (i.e. ground wheels) as well as a track (i.e., a belt) disposed around the drive assembly and the wheels. The track has an outer surface having traction lugs for engaging the ground surface, and an inner surface structured with respect to the drive assembly so as to be driven thereby for moving the vehicle along the ground surface. In friction drive track systems, the drive assembly includes a drive wheel connected to the drive axle of the vehicle. The drive axle imparts torque to the drive wheel, and driving of the track occurs due to friction exerted by an outer surface of the drive wheel against the inner surface of the track. In positive drive track systems, the drive axle instead connects to a drive assembly being a drive sprocket. Recesses of the inner surface of the track are structured and arranged with respect to teeth of the drive sprocket so as to be drivingly engageable thereby, provided that a suitable spatial relationship is maintained between recesses and teeth. Further, idler and rollers of track systems may also be sprockets, which require that an adequate spatial relationship be maintained between some of their respective teeth and recesses of the track for them to fulfill their load-bearing or track-aligning function properly.

In practice, such relationships are difficult to maintain due to variability of track system operating conditions (e.g., position and weight of vehicle cargo; type, compaction and orientation of ground surfaces; vehicle dynamics, etc.). In absence of a minimum engagement between at least some teeth and at least some recesses, positive drive systems are known to exhibit slippage of their drive sprockets (i.e., skipping of a tooth from one indentation to another), thereby adversely affecting their effectiveness in driving the track and moving the vehicle. Under certain circumstances, tensioning the track so that portions of the track exert pressure against sprocket teeth can desirably reduce occurrences of slippage. However, such pressure is known to generate friction and heat at contact interfaces between the track and the sprocket teeth, causing wear of the track and of the sprocket.

In addition, when operating the track system, debris originating from the ground surface may be ingested at the contact interfaces and accumulate thereon. Ingestion of such debris may, over time, cause wear by attrition of the track or to the sprocket. Further, ingestion of such debris may cause structural damage to the track or to the sprocket due to stress. Understandably, such deterioration may cause slippage, misalignment or de-tracking of the sprocket, thereby impairing track system performance. Under certain circumstances, ingestion of debris at a high frequency may accelerate the deterioration of the track systems. For example, during forward operation of track systems driven by a drive sprocket disposed rearwardly and upwardly of its rollers, debris ingested and expelled rearwardly by rollers may be conveyed by the track toward the drive sprocket, ingested by the drive sprocket causing some deterioration, and then expelled forwardly downwardly, only to be conveyed back to the drive sprocket to cause further deterioration. Further, it is known that track systems frequently operated in reverse (i.e. rearward operation) and having a drive sprocket disposed forwardly and upwardly of its rollers experience similar issues.

Conventionally, track system elements eventually reach the end of their useful life, become unqualified for operation and need to be repaired or replaced in order to restore adequate track system performance Under certain circumstances, a vehicle equipped with a positive drive track system may be decommissioned due to its sprocket requiring maintenance, although its track may not. Performing maintenance of the sprocket may require jacking the vehicle so that the track system is above ground level, reducing the tension in the track to release the sprocket, and may even require removing the track from around the sprocket. Understandably, handling of any element which does not require maintenance undesirably increases vehicle downtime.

Improvements in this area are therefore desirable.

SUMMARY

It is therefore an object of the present technology to ameliorate the situation with respect to at least one of the inconveniences present in the prior art.

It is also an object of the present invention to provide an improvement to track systems at least in some instances as compared with some of the prior art.

The creators of the present technology have realized several facts that are believed to be helpful in designing improved track systems.

In this regard, in known track systems, pressure exerted on the track is concentrated at recesses of the track cyclically engaging with sprocket teeth, thus leading to localised stress concentration and accelerated wear on or around these recesses. In internal-positive drive track systems, the recesses are shaped as valleys being defined by the space between drive lugs projecting from the inner track surface. In external-positive drive track systems, the recesses are instead shaped as indentations being in the track inward of the inner track surface. In hybrid-positive drive track systems, the track has some recesses shaped as valleys and some recesses shaped as windows, respectively engageable by some teeth of the sprocket.

A drawback of typical conventional track systems is that they are ineffective at balancing the pressure at the interface between the track and the sprocket to mitigate wear, in a way that also allows an effective transfer of torque from the drive axle to the track when operating the track system. A common issue with the typical conventional track systems is that attempts to distribute the pressure across a larger area of the inner track surface to relieve the areas adjacent to the recesses have been found to be detrimental to maintaining the spatial relationship between sprocket teeth and track recesses being required for the track recesses to remain drivingly engageable by the teeth under typical operating conditions.

Another issue with the typical conventional track systems is that by outspreading the load-bearing interface, additional portions of the inner track surface and of the sprocket have been exposed to deterioration due to normal operating loads. Outspreading of the load-bearing interface has also been found to be detrimental to evacuation of debris, undesirably affecting the incidence of debris ingestion.

The present technology was created with the forgoing information in mind.

According to an aspect of the present technology, there is provided a track system for a vehicle, the vehicle having an axle, the track system comprising a sprocket including a hub structured to be connected to the axle, a plurality of teeth radially outward of the hub, the plurality of teeth including a first tooth, a rim at least indirectly attached to the hub, the rim including a rim body, a resiliently deformable tread and a circumferential rim-outer surface, the tread extending radially outwardly of the rim-outer surface a resiliently deformable track disposed around the sprocket and tensionable up to a rated tension exerting pressure against the sprocket. The track having a track-inner surface and a plurality of lugs projecting therefrom. The track-inner surface including a track-inner-path surface and a track-inner-drive surface, a track-inner-path-surface portion in contact with the tread, the plurality of lugs including a first drive lug and a second drive lug, a track-inner-drive-surface portion extending between the first and second drive lugs, the first tooth located between the first and second drive lugs and spaced away from the track-inner-drive-surface portion. The sprocket and the track structured and arranged with respect to one another such that when the vehicle is stationary on a horizontal flat ground surface and the hub is connected to the axle, tensioning the track up to the rated tension causes the track-inner-path-surface portion to exert a track-tensioning-path pressure against the tread, thereby deforming the tread radially inwardly, and the track-inner-drive-surface portion to be displaced toward the first tooth.

In some embodiments, the hub defines a hub-rotation axis extending laterally outward from the hub, a radial plane extending radially outward from the hub-rotation axis; the tread, the track-inner-path-surface portion, the track-inner-drive-surface portion and the first-tooth being intersected by the radial plane.

In some embodiments, the rated tension is between 10% and 20% of a gross weight of the vehicle.

In some embodiments, the first tooth has a first-tooth distal end, and when the vehicle is stationary on the horizontal flat ground surface, the hub is connected to the axle and the track is tensioned to the rated tension, the first-tooth distal end is in contact with the track-inner-drive-surface portion.

In some embodiments, the axle is a drive axle and the sprocket is a drive sprocket.

In some embodiments, when the vehicle is stationary on the horizontal flat ground surface, the hub is connected to the axle, the track is tensioned to the rated tension, and the first-tooth distal end is in contact with the track-inner-drive-surface portion, the track-inner-path-surface portion exerts a track-rated-path pressure against the tread, the tread deformed radially inwardly, and the track-inner-drive surface exerts a track-rated-drive pressure against at least one tooth of the plurality of teeth, the at least one tooth including the first tooth, the track-rated-drive pressure being lesser than the track-rated-path pressure.

In some embodiments the track-rated-drive pressure is between 0% and 50% of the track-rated-path pressure.

In some embodiments when the vehicle is operated on a ground surface, the hub is connected to the axle, the tread is deformed radially inwardly, the first-tooth distal end is in contact with the track-inner-drive-surface portion, and at least a portion of the track is tensioned under an operating tension greater than the rated tension, the track-inner-path-surface portion exerts a track-operating-path pressure against the tread, the track-inner-drive surface exerts a track-operating-drive pressure against at least one tooth of the plurality of teeth, the track-operating-drive pressure being equivalent to the track-operating-path pressure.

In some embodiments, the operating tension is between 110 and 150% of the rated tension.

In some embodiments, the first tooth, the first drive lug, the track-inner-drive-surface portion and the second drive lug are structured, shaped and positioned with respect to one another such that when the vehicle is stationary on a horizontal flat ground surface, the hub is connected to the axle and the track is being tensioned up to the rated tension, the first tooth distal end is within an engageable distance from the track-inner-drive-surface portion, the first and second drive lugs being in a drivingly engageable configuration.

In some embodiments, the first tooth, the first drive lug, the track-inner-drive-surface portion and the second drive lug are structured, shaped and positioned with respect to one another such that when the vehicle is operated on a ground surface, the hub is connected to the axle and at least a portion of the track is tensioned under an operating tension varying between a first operating tension lesser than the rated tension and a second operating tension greater than the rated tension, the first tooth distal end is within an engageable distance from the track-inner-drive-surface portion, the first and second drive lugs being in a drivingly engageable configuration.

In some embodiments, when the vehicle is operated on a ground surface, the hub is connected to the axle, at least a portion of the track is tensioned to the operating tension, the tread is deformed radially inwardly and the track-inner-path portion is deformed radially outwardly, the tread being spaced from the track-inner-path portion by a distance equal to the engageable distance, the first-tooth distal end is within the engageable distance.

In some embodiments, the operating tension varies between 50% and 200% of the rated tension.

In some embodiments, the sprocket has a plurality of rim sectors forming the rim, at least one rim sector of the plurality of rim sectors being detachably attachable to the hub.

In some embodiments, the rim has a resiliently deformable ring extending radially inwardly from the rim-outer surface, the ring structured and arranged with respect to the rim body so as to be less rigid than the rim body.

In some embodiments, the ring is structured and arranged with respect to the tread and the body so as to be more rigid than the tread.

In some embodiments, the rim has a resiliently deformable ring, and the rim body has a rim-inboard surface, a rim-outboard surface and at least one recess, the at least one recess in the rim body inward of the rim-outer surface and extending laterally outwardly from outward of the rim-inboard surface to inward of the rim-outboard surface, the ring being disposed in the at least one recess.

In some embodiments, the tread and the ring form an integral piece.

In some embodiments, the sprocket has a plurality of rim sectors forming the rim, a first rim sector of the plurality of rim sectors being detachably attached to the hub, the first rim sector having the at least one recess.

According to another aspect of the present technology, there is provided a track system for a vehicle, the vehicle having an axle, the track system comprising a sprocket including a hub structured to be connected to the axle, a plurality of teeth radially outward of the hub, a rim at least indirectly attached to the hub, the rim including a rim body, a circumferential rim-body outer surface, a recess in the rim body inward of the rim-body outer surface, a resiliently deformable ring disposed in the recess, the ring structured and arranged with respect to the rim body so as to be less rigid than the rim body, a resiliently deformable tread extending outwardly of the rim-outer surface, the tread connected to the ring, a resiliently deformable track disposed around the sprocket, the track having a track-inner surface in contact with the tread. The sprocket and the track are structured and arranged with respect to one another such that when the vehicle is operated on a ground surface and the hub is connected to the axle, ingestion of debris between the track-inner surface and the tread exerting pressure against the tread causes at least one of the tread to be resiliently deformed radially inwardly and the ring to be deformed radially inwardly.

In some embodiments, the sprocket has a plurality of rim sectors forming the rim, a first rim sector of the plurality of rim sectors being at least indirectly detachably attached to the hub, the first rim sector having the at least one recess.

In some embodiments, the tread and the ring form an integral piece.

In some embodiments, the ring is structured and arranged with respect to the tread and the body so as to be more rigid than the tread.

In some embodiments, the plurality of teeth includes a first tooth, the track tensionable up to a rated tension exerting pressure against the sprocket, the track-inner surface having a track-inner-drive surface, a plurality of drive recesses disposed along the track-inner-drive surface, the plurality of drive recesses including a first drive recess, the first drive recess having a first-drive-recess bottom, and a track-inner-path-surface portion in contact with the tread, the first tooth radially aligned with the first drive recess and spaced away from the first-drive-recess bottom. The sprocket and the track structured and arranged with respect to one another such that when the vehicle is stationary on a horizontal flat ground surface and the hub is connected to the axle, tensioning the track up to the rated tension causes the track-inner-path-surface portion to exert a track-tensioning-path pressure against the tread, thereby deforming the tread radially inwardly, and the first-drive-recess bottom to be displaced toward the first tooth.

In some embodiments, the axle is a drive axle and the sprocket is a drive sprocket.

In some embodiments, the first tooth and the first drive recess are structured, shaped and positioned with respect to one another such that when the vehicle is stationary on a horizontal flat ground surface, the hub is connected to the axle, the track is being tensioned up to the rated tension and the first-drive-recess bottom is being displaced toward the first tooth, the first drive recess moves from an initial configuration to a drivingly engageable configuration.

In some embodiments, the rated tension is between 10% and 20% of a gross weight of the vehicle.

In some embodiments, the first tooth has a first-tooth distal end spaced away from the first-drive-recess bottom by an initial tooth distance, the first drive recess being in the drivingly engageable configuration when the first-tooth distal end is within a first-ingestion-tension tooth distance from the first-drive-recess bottom, and when the vehicle is operated on a ground surface, the hub is connected to the axle, the tread is deformed radially inwardly, and at least a portion of the track is tensioned under an operating tension varying between a first ingestion tension lesser than the rated tension and a second ingestion tension greater than the rated tension, the first-tooth distal end is within the first-ingestion-tension tooth distance from the track-inner-drive-surface portion.

In some embodiments, the operating tension varies between 50% and 200% of the rated tension.

In some embodiments, the track system is an external-positive drive track system, the plurality of drive recesses being in the track inward of the track-inner surface.

In some embodiments, the track system is an internal-positive drive track system, and the track has a plurality of drive lugs projecting from the track-inner-drive surface, the plurality of drive recesses being a plurality of spaces formed between adjacent drive lugs of the plurality of drive lugs, the first drive recess being a space formed between a first and a second drive lug of the plurality of drive lugs, the first and second drive lugs adjacent to one another, the first drive recess bottom being a portion of the track-inner-drive surface extending between the first and second drive lugs.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of embodiments of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 1 is a lateral, inboard-facing elevation view of a track system being an embodiment of the present technology;

FIG. 2 is a section view of a track of the track system as depicted in FIG. 1 taken through line 2-2 of FIG. 1;

FIG. 3B is a plan view of a rim body and a tread of the sprocket as depicted in FIG. 3A;

FIG. 13 is schematic, inboard-facing lateral elevation view of a tooth and first and second drive lugs of the track system of FIG. 1, with a tread of the sprocket and the track being deformed.

DETAILED DESCRIPTION

Figure 3A:
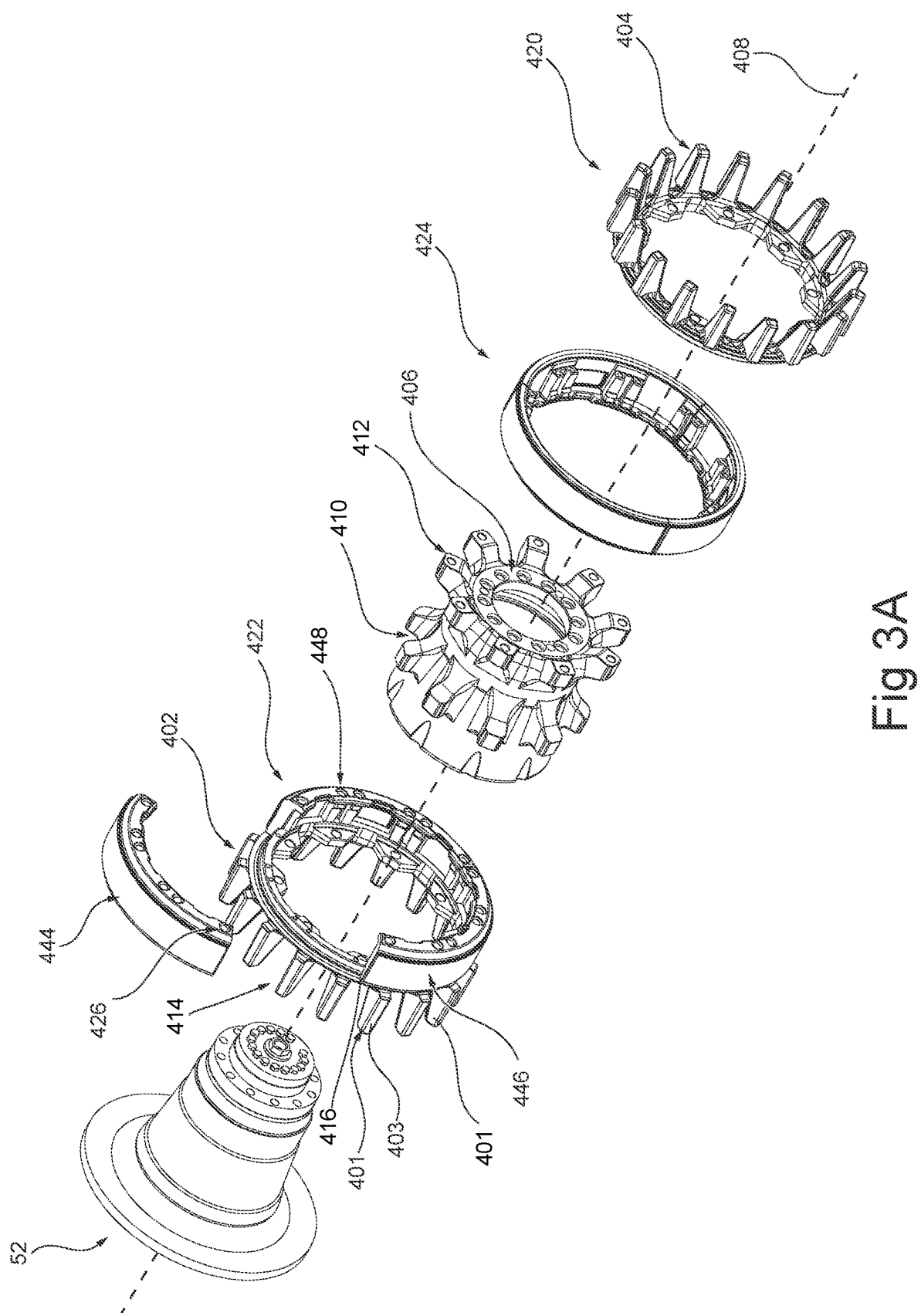
FIG. 3A is an exploded perspective view taken from a front, left, top side of a sprocket of the track system as depicted in FIG. 1.

With reference to the FIGS. 1 to 13, an embodiment of a track system 100 according to the present technology is illustrated. It is to be expressly understood that the track system 100 is merely an embodiment of the present technology. Thus, the description thereof that follows is intended to be only a description of an illustrative example of the present technology. This description is not intended to define the scope or set forth the bounds of the present technology.

In some cases, what are believed to be helpful examples of modifications or alternatives to the track system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where no examples of modifications have been set forth, it should not be interpreted that no modifications are possible and/or that what is described is the sole manner of implementing or embodying that element of the present technology. As a person skilled in the art would understand, this is likely not the case.

In addition, it is to be understood that the track system 100 may provide in certain aspects a simple embodiment of the present technology, and that where such is the case it has been presented in this manner as an aid to understanding. As persons skilled in the art would understand, various embodiments of the present technology may be of a greater complexity than what is described herein.

The general construction of the track system 100 will be described with respect to FIGS. 1 and 2. A vehicle 50 (not shown) is stationary on a horizontal flat ground surface 10. The track system 100 is mounted to the vehicle 50 via a support frame (not shown) of the track system 100. Further, the track system 100 comprises a plurality of wheels 200 and a track 300 disposed around the plurality of wheels 200. The plurality of wheels 200 includes an idler wheel (not shown), rollers 204, and a sprocket 400. The vehicle 50 has an axle (not shown) connected to the sprocket 400. The axle is a drive axle and, in this embodiment, the track system 100 is an internal-positive drive track system, and the sprocket 400 is a drive sprocket 400. The sprocket 400 is disposed rearward and above the rollers 204. The track 300 has a track body 301 (FIG. 1) extending between an outwardly facing track-outer surface 302 and an inwardly facing track-inner surface 306. Traction lugs 303 are disposed along the track-outer surface 302. A portion 304 of the track-outer surface 302 located under the rollers 204 supports the vehicle 50 on the ground surface 10.

As best seen in FIG. 2, guide lugs 308 project from the track-inner surface 306. The track-inner surface 306 includes an inboard track-inner-path surface 310 and an outboard track-inner-path surface 312, respectively disposed inboard and outboard of the guide lugs 308. The track-inner surface 306 includes an inboard track-inner-drive surface 314 and an outboard track-inner-drive surface 316, respectively disposed inboard of the inboard track-inner-path surface 310 and outboard of the outboard track-inner-path surface 312. An inboard plurality of drive lugs 318 and an outboard plurality of drive lugs 320 project from the inboard and outboard track-inner-drive surfaces 314, 316, respectively. The pluralities of drive lugs 318, 320 are structured, shaped and arranged so as to be drivingly engageable by inboard 402 (FIG. 3A) and outboard 404 pluralities of teeth 401 of the sprocket 400 under certain circumstances described hereinbelow.

In the present embodiment, the outboard track-inner-path surface 312, the outboard track-inner-drive surface 316 and the outboard plurality of drive lugs 320, are respectively mirror images of the inboard track-inner-path surface 310, the inboard track-inner-drive surface 314 and the inboard plurality of drive lugs 318 and, as such, descriptive statements will be directed to the latter and will not be repeated for the mirror images. It is contemplated that, in some implementations, the outboard track-inner-path surface 312, the outboard track-inner-drive surface 316 and the outboard plurality of drive lugs 320 may have distinguishing features that are not material to the present technology and therefore will not be described herein.

Referring back to FIG. 1, the track system 100 further includes a tensioner (not shown) forcing an idler wheel (not shown) against the track-inner surface 306. The track 300 is tensioned by the tensioner to an initial tension 12 (FIG. 1). It is contemplated that tensioning of the track 300 by the tensioner up to the initial tension 12 may cause sagging (not shown) of a top track segment 321 (extending between the idler wheel and the sprocket 400) and of a rear track segment 323 (extending between the sprocket 400 and a rearward-most roller of the rollers 204) to be reduced.

It is contemplated that, in some embodiments, guide lugs 308 may be omitted. In some such embodiments, the inboard and outboard track-inner-path surfaces 310, 312 form a unitary track-inner-path surface.

In some embodiments, the track system 100 is a positive-external drive track system.

In some embodiments, the track system 100 is a positive-hybrid drive track system.

In some embodiments, one of the inboard track-inner-path surface 310 and the outboard track-inner-path surface 312 is omitted.

In some embodiments, one of the inboard track-inner-drive surface 314, the inboard plurality of drive lugs 318 and the inboard plurality 402 of teeth 401, and the outboard track-inner-drive surface 316, plurality of drive lugs 320 and the outboard plurality 320 of teeth 401 is omitted.

With reference to FIGS. 3A to 12, the sprocket 400 will now be described. Referring to FIG. 3A, the sprocket 400 includes a hub 406 (i.e., a sprocket carrier) structured to be connected to the axle of the vehicle 50. The hub 406 is indirectly connected to the drive axle. The hub 406 is attached to a final drive assembly 52 and the final drive assembly 52 is connected to the drive axle. The hub 406 is connected to the final drive assembly 52. Fasteners connect the hub 406 and the final drive assembly 52 to form a non-permanent hub joint 54 (best seen in FIGS. 10 and 11). It is contemplated that the non-permanent hub joint 54 could be formed otherwise. The hub 406 defines a hub-rotation axis 408 (FIG. 3A). The final drive assembly 52 is rotatable about the hub-rotation axis 408 by the axle. The hub 406 is rotatable with the final drive assembly 52 about the hub-rotation axis 408 to impart torque to the sprocket 400. The hub 406 has an inboard hub-crown flange 410 facing laterally inward and an outboard hub-crown flange 412 facing laterally outward.

Still referring to FIG. 3A, the sprocket 400 further includes an inboard crown 414 supporting the inboard plurality 402 of teeth 401, an outboard crown 420 supporting the outboard plurality 404 of teeth 401, an inboard rim 422 and an outboard rim 424. In the present embodiment, the outboard crown 420 and the outboard rim 424 are respectively mirror images of the inboard crown 414 and the inboard rim 422 and, as such, descriptive statements will be directed to the latter and will not be repeated for the mirror images. It is contemplated that, in some implementations, the outboard crown 420 or the outboard rim 424 may have distinguishing features that are not material to the present technology and therefore will not be described herein.

Figure 11:
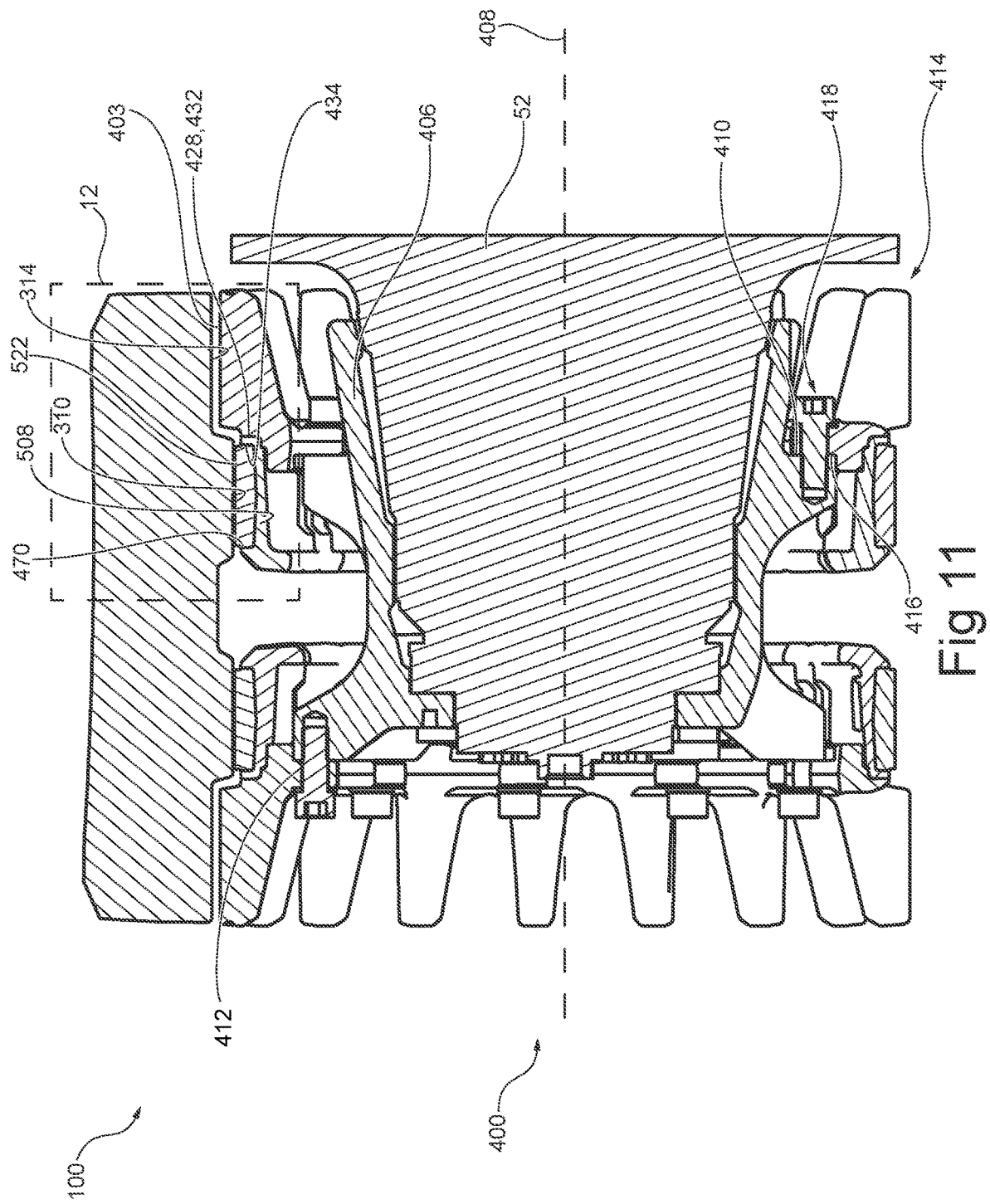
FIG. 11 is a section view of the track system of FIG. 1 taken through cross-section line 11-11 of FIG. 1 with the track tensioned to the initial tension.

Still referring to FIG. 3A, the inboard crown 414 includes an inboard-crown flange 416 and the inboard plurality 402 of teeth 401. Each tooth 401 of the inboard plurality 402 of teeth 401 projects laterally inwardly and radially outwardly from the inboard-crown flange 416. The teeth 401 extend radially outwardly to tooth distal ends 403. The inboard-crown flange 416 is connected to the inboard hub-crown flange 410. Fasteners (not shown) are used with the inboard-crown flange 416 and the inboard hub-crown flange 410 to form a non-permanent crown joint 418 (FIG. 11). The inboard crown 414 is rotatable with the hub 406 about the hub-rotation axis 408.

Figure 8:
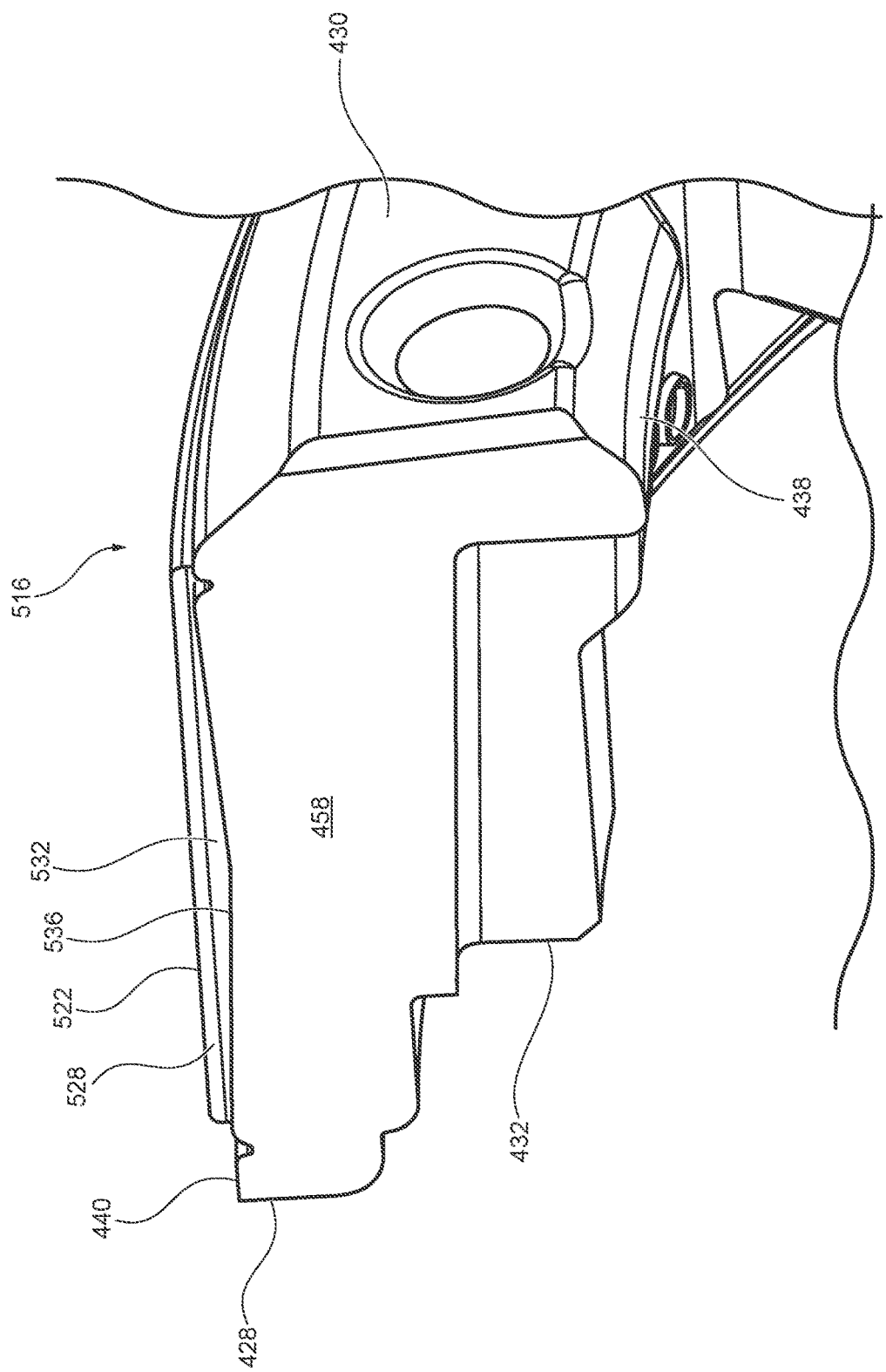
FIG. 8 is a perspective view taken from a front, left, bottom side of the rim sector as depicted in FIG. 5.
Figure 9:
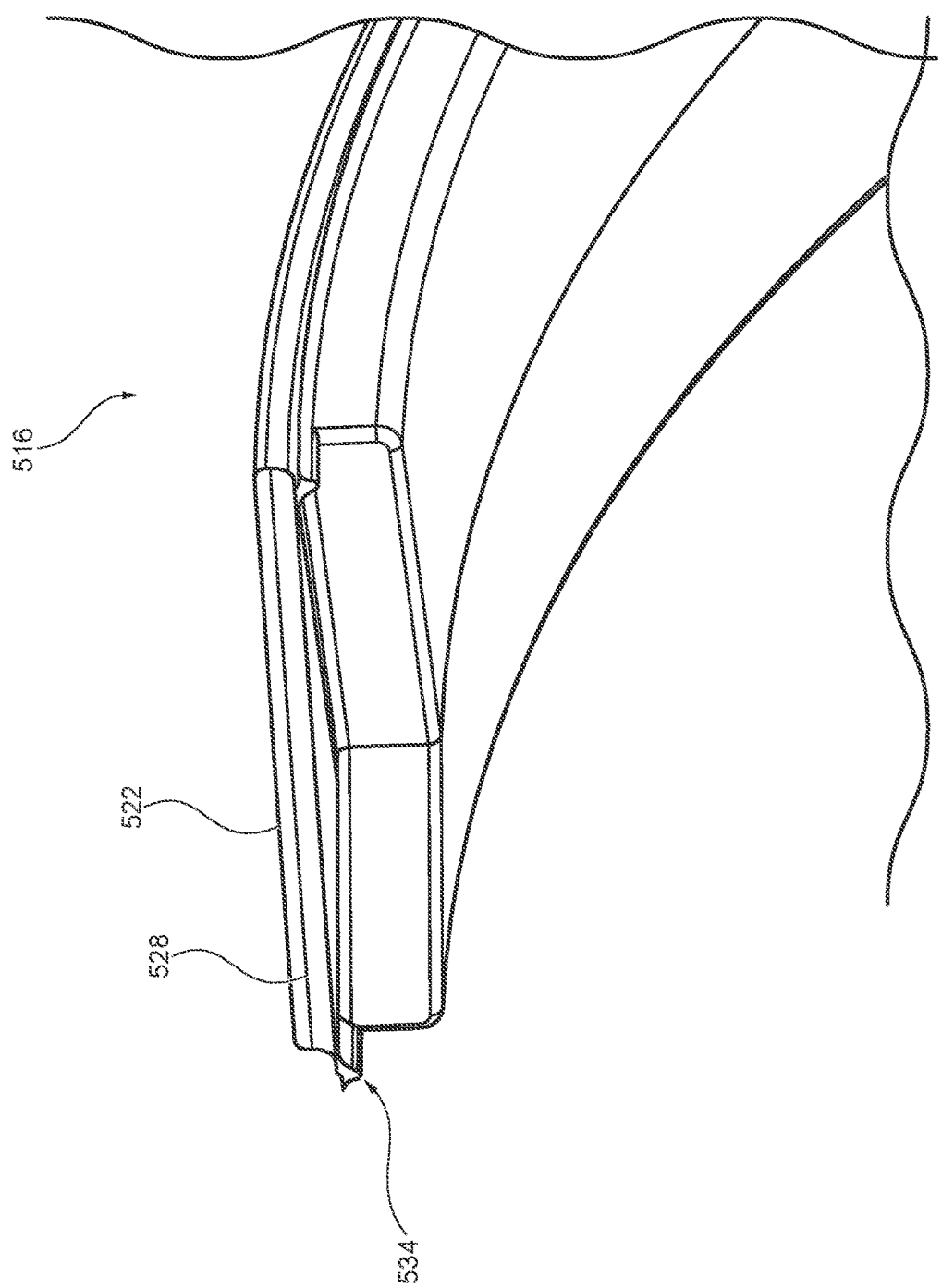
FIG. 9 is a perspective view taken from a front, left, bottom side of the ring portion and the tread portion of the rim sector as depicted in FIG. 5 with a rim body sector of the rim sector being removed.

The inboard rim 422 extends radially outwardly and stops inwardly of the tooth distal ends 403. The inboard rim 422 includes a rim body 426, a resiliently deformable ring 506 and a resiliently deformable tread 514, best seen in FIG. 3B. The rim body 426 extends radially outwardly from a rim-inner surface 438 (FIG. 4) to a circumferential rim-body outer surface 440 (FIG. 5). The rim body 426 extends laterally outward from a rim-inboard surface 428 to a rim-outboard surface 430, best seen in FIG. 6. The rim-inboard surface 428 defines an inboard-rim flange 432 (FIG. 8). The inboard-rim flange 432 is connected to an inboard crown-rim flange 434 (FIG. 11) of the inboard crown 414. Fasteners are used with the inboard-rim flange 432 and the inboard crown-rim flange 434 to form a non-permanent rim joint. The inboard rim 422 is rotatable with the hub 406 about the hub-rotation axis 408.

Figure 4:
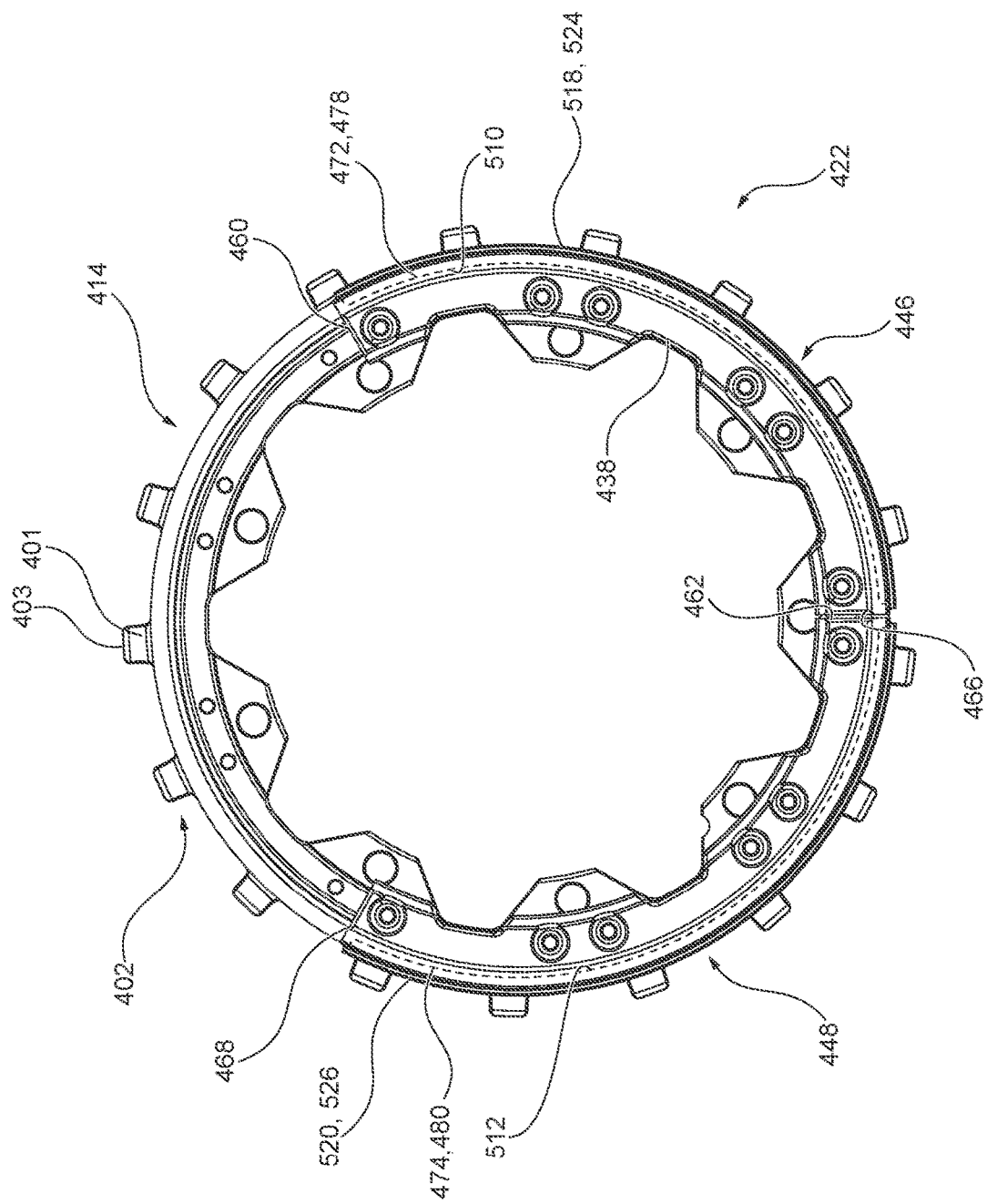
FIG. 4 is an inboard-facing, lateral elevation view of an inboard crown and an inboard rim of the sprocket of FIG. 3A, with a rim sector of the inboard rim being removed.
Figure 5:
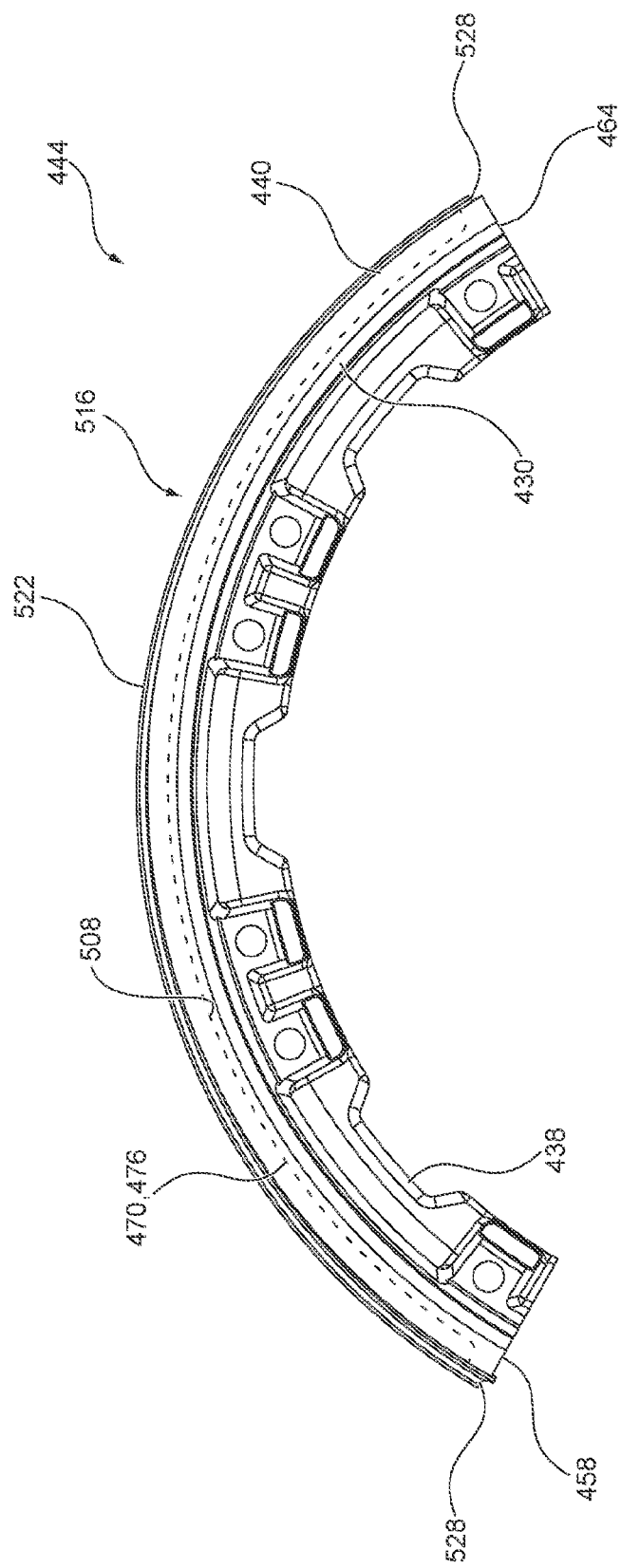
FIG. 5 is an inboard-facing, lateral elevation view of the rim sector isolated from the inboard rim depicted in FIG. 4.

Referring to FIGS. 3A to 9, the sectorial structure of the inboard rim 422 will now be described. The inboard rim 422 is formed by a plurality of rim sectors. Rim sectors 444, 446, 448 are connected to the inboard crown 414. Each rim sector 444, 446, 448 is detachable and removable from the inboard crown 414 independently from one another. As best seen in FIG. 3B, a plurality of rim-body sectors, including rim-body sectors 452, 454, 456, forms the rim body 426. Turning now to FIG. 4, the inboard crown 414 and the inboard rim 422 are shown, with the rim sector 444 being removed. Rim-body sectors 452, 454, 456 respectively extend circumferentially between body-distal-first 458, 460, 462 and body-distal-second 464, 466, 468 surfaces (best seen in FIGS. 4 and 5). The rim-body-sectors 452, 454, 456 each include a rim recess 470, 472, 474 (FIGS. 4 and 5). The rim recesses 470, 472, 474 respectively extend radially inward of the rim body 426 to bottom recess surfaces 476, 478, 480 (FIGS. 4 and 5). The rim recesses 470, 472, 474 respectively extend laterally outwardly from inboard recess surfaces 482 to outboard recess surfaces 488 (only shown with respect to rim sector 444 in FIG. 6). The rim recesses 470, 472, 474 respectively extend circumferentially between recess-distal-first 494 and recess-distal-second 500 surfaces (only shown with respect to rim sector 444 in FIG. 6).

Referring to FIG. 3B, the resiliently deformable ring 506 is formed by ring portions 508, 510, 512. The ring portions 508, 510, 512 are sized to fill the rim recesses 470, 472, 474, each ring portion 508, 510, 512 being confined radially inwardly, laterally and circumferentially by the rim body 426. The ring portions 508, 510, 512 are respectively retained (various retention means are contemplated) in the rim recesses 470, 472, 474. It should be noted that retention of the ring portions 508, 510, 512 within the rim recesses 470, 472, 474 is achieved as a result of an overmolding process.

Still referring to FIG. 3B, the tread 514 is formed by tread portions 516, 518, 520. The tread portions 516, 518, 520 respectively extend radially outwardly from the ring portions 508, 510, 512. The tread portions 516, 518, 520 respectively form integral pieces with the ring portions 508, 510, 512. Each tread portion 516, 518, 520 has a tread-margin surface 528 (only shown with respect to tread portion 516 in FIGS. 5, 7-9) that extends radially outwardly of the rim-body outer surface 440 to a tread-outer surface 522, 524, 526 (FIGS. 4 and 5). The tread-margin surfaces 528 circumscribe the tread-outer surfaces 522, 524, 526. The tread-margin surfaces 528 and the tread-outer surfaces 522, 524, 526 are unconfined by the rim body 426. Tread extensions 534 (FIG. 9) project distally outwardly from either sides of the tread-margin surface 528. The tread extensions 534 are embedded into recessed portions 536 (FIG. 8) of the rim-body outer surface 440 extending outwardly from either sides of the rim recesses 470, 472, 474.

In this embodiment, the ring portions 508, 510, 512 and the tread portions 516, 518, 520 are constructed of a same resilient material, although it does not have to be the case. The rim body 426 is constructed of a rim material being substantially more rigid than the resilient material. As non-limiting examples, resilient materials include rubber and polyurethane, and rim materials include steel, non-ferrous metals, other metal alloys, composites, and plastics. It should be noted that, when any one ring portion 508, 510, 512 is bearing a pressure exerted radially inwardly from an adjacent tread portion 516, 518, 520, radial inward, lateral and circumferential confinement of the one ring portion 508, 510, 512 by the rim body 426 assists in causing the one ring portion 508, 510, 512 to have an effective ring rigidity between a rim rigidity of the rim body 426 and a tread rigidity of the adjacent tread portion 516, 518, 520.

It is contemplated that the effective ring rigidity being lesser than the rim rigidity desirably affects durability of the tread portions 516, 518, 520. For example, one tread portion 516, 518, 520 may be deformed radially inwardly at a maximum resilient deformation when under a pressure exerted by the track 300. Under certain circumstances, additional stress exerted to the one tread portion 516, 518, 520 by ingested debris may cause the radially adjacent ring portion 508, 510, 512 to deform and to dissipate the additional stress. It is also contemplated that when a crack (not shown) is present in one of the tread portion 516, 518, 520, deformation of the radially adjacent ring portion 508, 510, 512 may desirably mitigate growth of the crack.

In some embodiments, the hub 406 is formed of an inboard hub portion (not shown) and an outboard hub portion (not shown), the inboard and outboard hub portions being connected to one another. In some such embodiments, the inboard and outboard hub portions are attached to the inboard crown 414 and the outboard crown 420, respectively. In some such embodiments, the inboard and outboard hub portions are attached to the inboard rim 422 and the outboard rim 424, respectively.

In some embodiments, one of the inboard crown 414 and the outboard crown 420 is omitted. In some such embodiments, a corresponding one of the inboard track-inner-drive surface and the outboard track-inner-drive surface is omitted.

In some embodiments, at least one of the inboard rim 422 and the outboard rim 424 is attached directly to the hub 406.

In some embodiments, one of the inboard rim 422 and the outboard rim 424 is absent.

In some embodiments, at least one of the inboard rim 422 and the outboard rim 424 forms an integral piece with at least one of the inboard crown 414 and the outboard crown 424, respectively.

In some embodiments, the hub 406 is structured to be one of rotatably connected to an axle of the vehicle other than the drive axle, and rotatably connected to the support frame of the track system 100. In some such embodiments, the sprocket 400 is one of an idler wheel or a road wheel of the plurality of wheels 200.

In some embodiments, at least one rim recess 470, 472, 474 extends circumferentially between body-distal-first 458, 460, 462 and body-distal-second 464, 466, 468 surfaces of at least one rim-body sectors 452, 454, 456.

In some embodiments, the rim body 426 is an integral piece. In some such embodiments, a rim recess 470, 472, 474 extends along a circumference of the rim body 426. In some such embodiments, the ring 506 is an integral piece.

Figure 6:
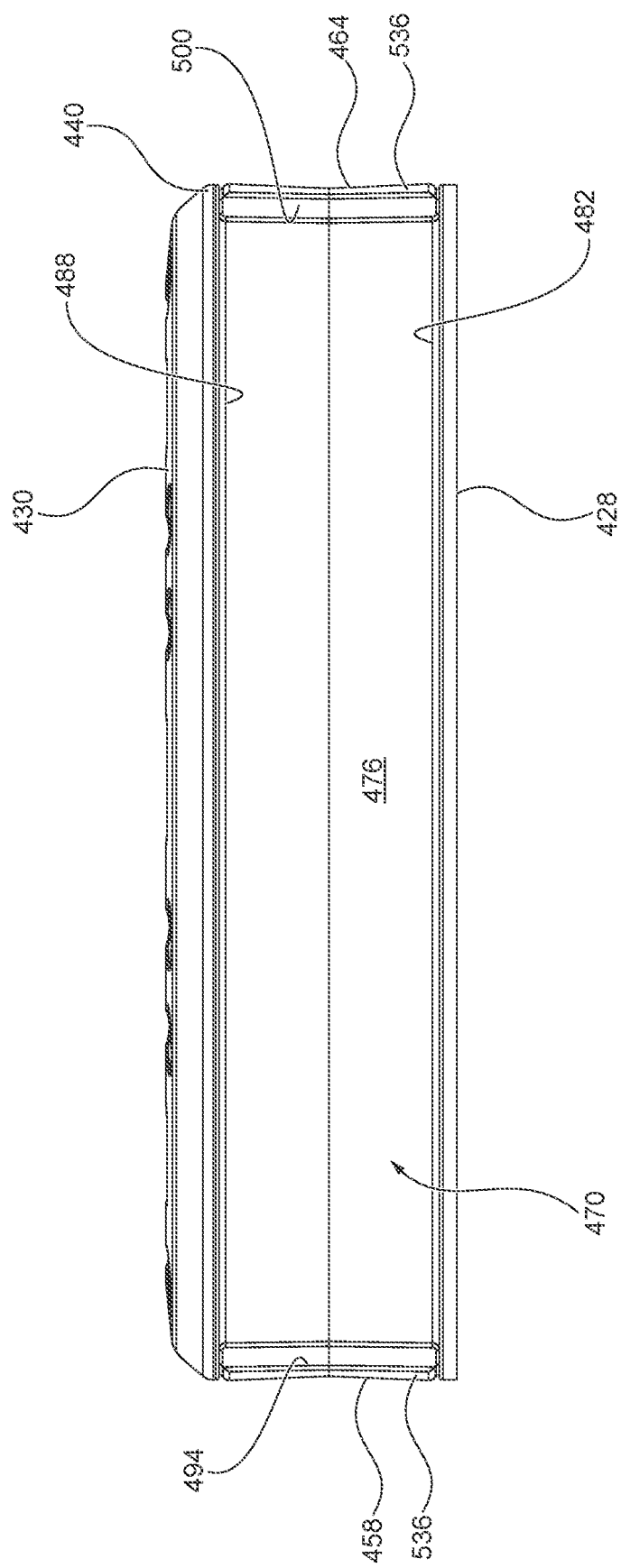
FIG. 6 is a top plan view of the rim sector depicted in FIG. 5, with a ring portion of the rim sector and a tread portion of the rim sector being removed.
Figure 7:
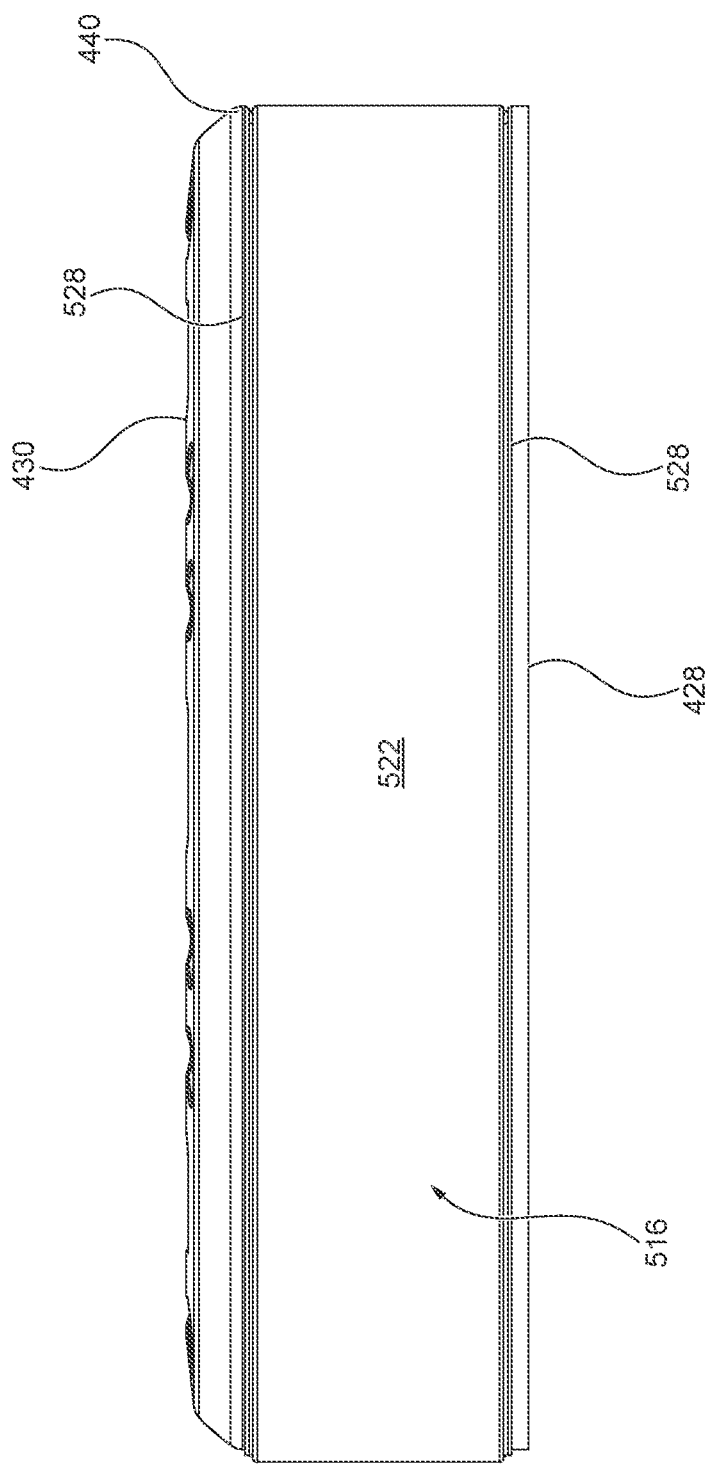
FIG. 7 is a top plan view of the rim sector depicted in FIG. 5.

In some embodiments, the ring 506 extends laterally outwardly from the rim-inboard surface 428 to the rim-outboard surface 430 (FIG. 6). In such embodiments, the ring 506 has the rim-body outer surface 440.

Figure 10:
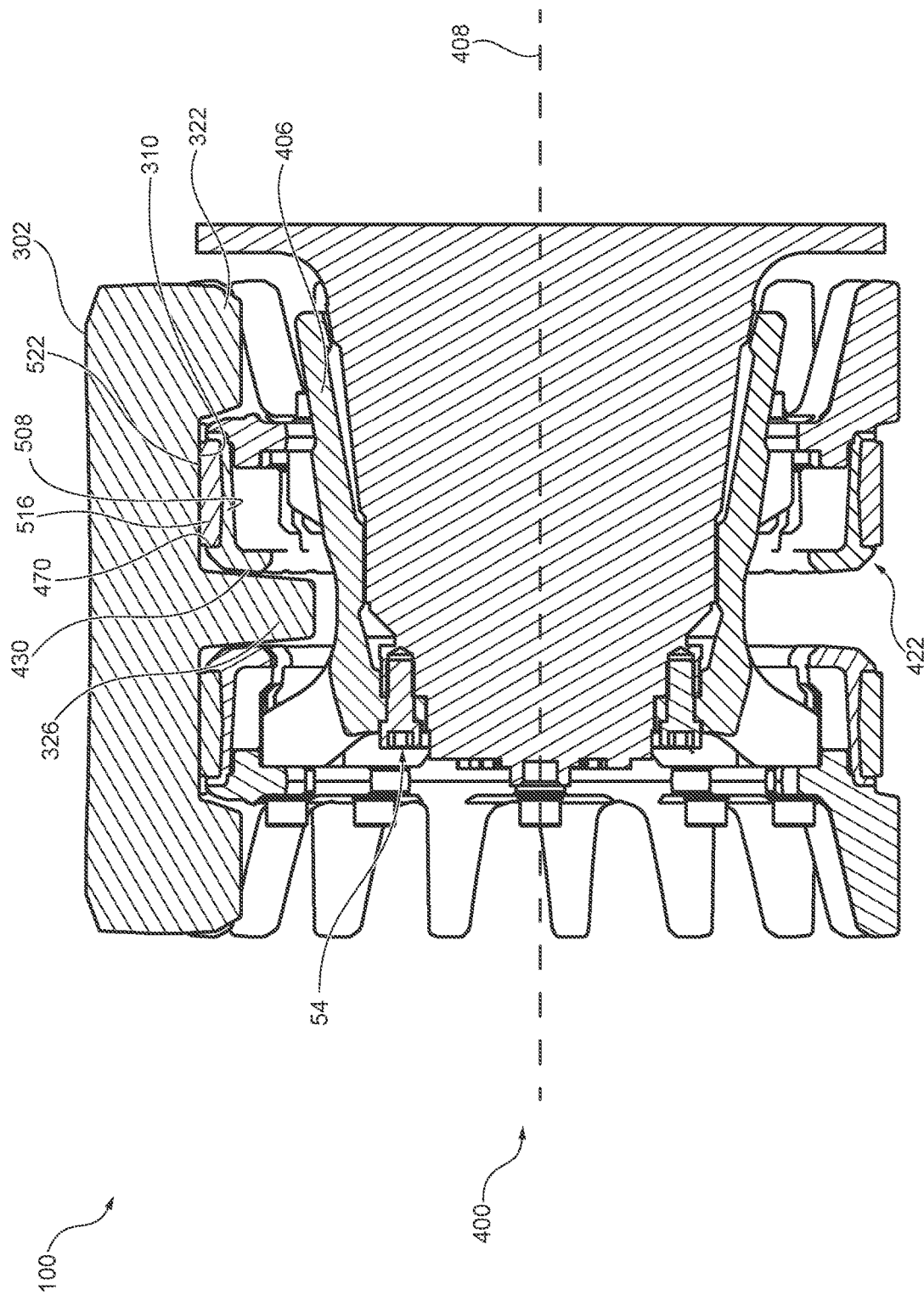
FIG. 10 is a section view of the track system of FIG. 1 taken through cross-section line 10-10 of FIG. 1 with the track tensioned to an initial tension.

Referring to FIGS. 10 to 13, operating principles of the track system 100 will now be described. In FIGS. 10 and 11, the track 300 is under the initial tension 12 (FIG. 1). The tread portion 516 is shown slightly deformed, with its outer surface 522 flattened against the inboard track-inner-path surface 310. A first tooth 538 (FIGS. 12-13) of the inboard plurality 402 of teeth 401 has its distal end 403 spaced radially inward from the inboard track-inner-drive surface 314.

Figure 12:
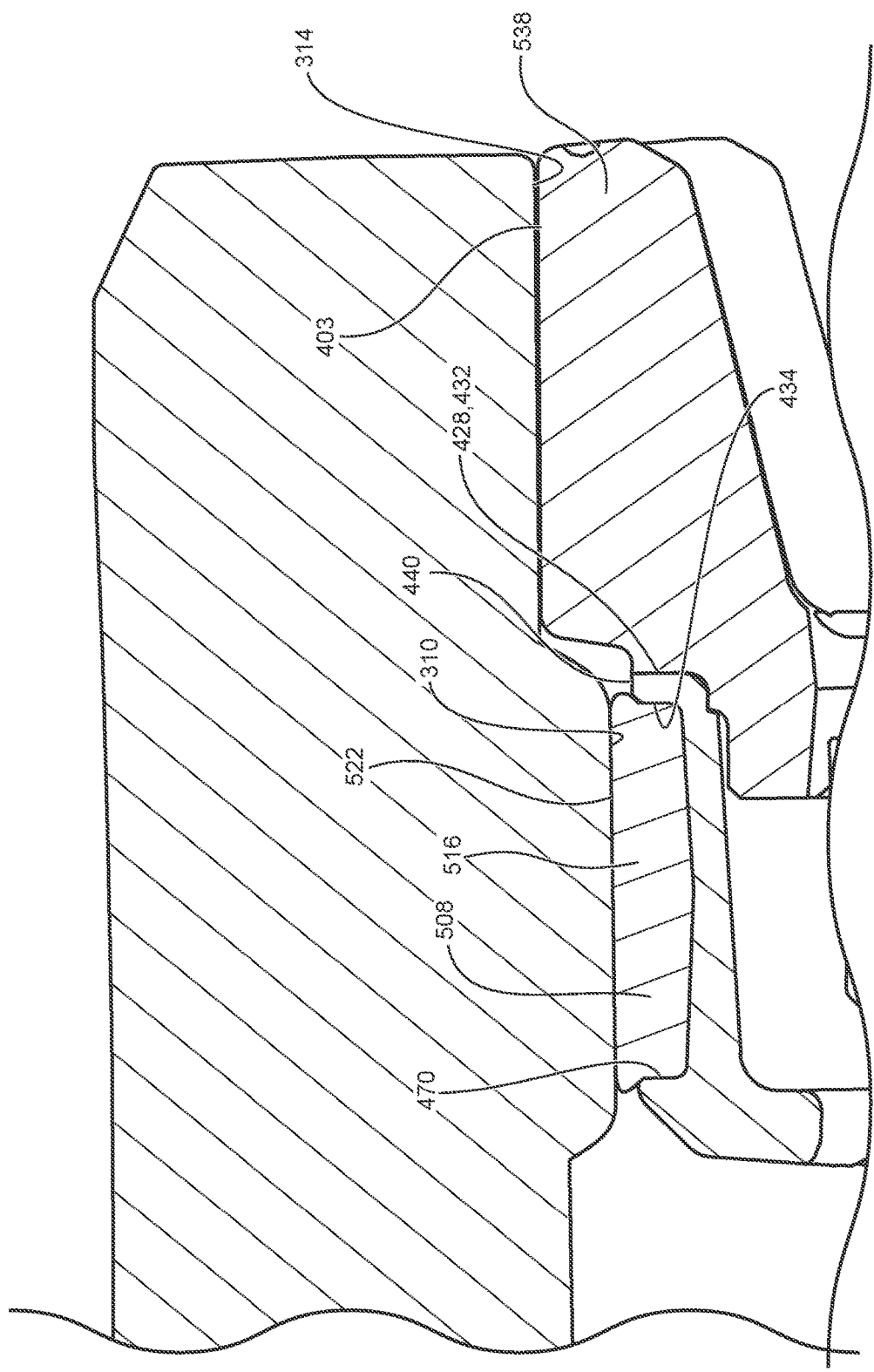
FIG. 12 is a cut-away section view of the track system as depicted in FIG. 11 with the track tensioned to a rated tension.

Turning now to FIG. 12, the track 300 is tensioned to a rated (i.e. nominal) tension being greater than the initial tension 12. It is contemplated that the rated tension is between 10% and 20% of a gross weight of the vehicle 50. It is also contemplated that the rated tension may be determined as a function of vehicle specifications. Under the rated tension, the tread portion 516 is further deformed radially inwardly under the pressure exerted by the track-inner-path surface 310. The tread portion 516 is slightly bulged laterally inwardly and outwardly of the recess portion 470, yet remains radially outward of the rim-body outer surface 440. It should be noted that the shape and construction of the tread portion 516 discourages impingement of the tread portion 516 against the rim-body outer surface 440, thereby desirably affecting its durability. The inboard track-inner-path surface 310 is shown to have slightly deformed radially toward the track-outer surface 302. It should also be noted that the sprocket 400 is structured and arranged with respect to the track 300 so that radial deformations of the tread portion 516 and of the inboard inner-track-path surface 310 result in the inboard track-inner-drive surface 314 to be in contact with the distal end 403 of the first tooth 538.

In FIG. 13, the first tooth 538 is shown positioned relative to a first and a second drive lug 322, 324 of the inboard plurality of drive lugs 318. The first and second drive lugs 322, 324 respectively have an engagement portion 328, 330 extending outwardly from the inboard track-inner-drive surface 314 by an engagement distance 332 representing half of a height of the lugs 322, 324, although it is contemplated that the engagement distance 332 may be different. The engagement portions 328, 330 and the inboard track-inner-drive surface 314 together define a first drive recess 334. The first drive recess 334 is shown in a drivable configuration with respect to the first tooth 538. The first tooth 538 and the drive recess 334 are sized one with respect to the other such that when the distal end 403 of the first tooth 538 is within the drive recess 334, the first tooth 538 is drivingly engageable with at least one of the first and second drive lugs 322, 324, i.e. capable of imparting torque against their respective engagement portion 328, 330. Further, the tread 516 and the track-inner-path surface 310 are respectively shown deformed in regions 540, 336 due to a debris 20 ingested therebetween. It should be noted that the debris 20 extends between the tread 516 and the track-inner-path surface 310 by a distance equal to the distance 332.

It is contemplated that when the track system 100 is being operated, the sprocket 400 imparts torque to the track 300 which causes at least portions of the track 300 to be tensioned to an operating tension between 50% (i.e. first resulting operating tension) and 200% (i.e. second resulting operating tension) of the rated tension. It is contemplated that variation of the operating tension may occur, for example, when the vehicle 50 accelerates, decelerates or makes turns. The sprocket 400 is structured and arranged with respect to the track 300 such that when the track system 100 is being operated and the debris 20 is ingested between the tread 516 and the track-inner-path surface 310, the first tooth 538 remains drivingly engageable with at least one of the first and second drive lugs 322, 324.

Also, it should be noted that pressure begins to be exerted by the track-inner-drive surface 314 onto the teeth distal ends 403 once the track 300 is tensioned under at least the rated tension. The sprocket 400 is structured and arranged with respect to the track 300 such that the pressure exerted by the track-inner-drive surface 314 onto the teeth distal ends 403 is equivalent to the pressure exerted by the track-inner-path surface 310 onto the tread portion 516 when the track 300 is tensioned under an average operating track tension (i.e. between 110% and 150% of the rated tension). It is contemplated that the sprocket 400 and the track 300 structured and arranged as described herein may, under certain circumstances, cause the pressures applied across the track inner-surface 306 to be balanced when the track system 100 is operated under average operating conditions, which may desirably affect the overall durability of the track system 100.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

The invention claimed is:

1. A track system for a vehicle, the track system comprising:
 a drive sprocket including:
 a hub connectable to an axle of the vehicle;
 a plurality of teeth extending radially outward of the hub, the plurality of teeth including a first tooth;
 a rim at least indirectly attached to the hub, the rim including a resiliently deformable tread;
 a resiliently deformable track disposed around the drive sprocket and tensionable up to a rated tension exerting pressure against the drive sprocket, the resiliently deformable track having a track-inner surface and a plurality of lugs projecting therefrom;
  the track-inner surface including a track-inner-path surface and a track-inner-drive surface, a track-inner-path-surface portion in contact with the resiliently deformable tread;
  the plurality of lugs including a first drive lug and a second drive lug, a track-inner-drive-surface portion extending between the first and second drive lugs;
  the first tooth located between the first and second drive lugs and spaced away from the track-inner-drive-surface portion
 such that when the resiliently deformable track is tensioned to a rated tension, the track-inner-path-surface portion exerts a track-tensioning-path pressure against the resiliently deformable tread, thereby deforming the tread radially inwardly towards the hub; and
 the track-inner-drive-surface portion to be displaced towards the first tooth.

2. The track system of claim 1, wherein the rim further comprises a resiliently deformable ring, the resiliently deformable ring comprising the resiliently deformable tread.

3. The track system of claim 2, wherein the resiliently deformable tread is integrally formed with the resiliently deformable ring.

4. The track system of claim 2, wherein the rim comprises a plurality of rim sectors, each rim sector being independently removable from the hub.

5. The track system of claim 4, wherein the rim comprises three rim sectors.

6. The track system of claim 4, wherein the resiliently deformable ring comprises a plurality of ring portions, and each rim sector of the plurality of rim sectors is associated with a respective ring portion of the plurality of ring portions.

7. The track system of claim 6, wherein each rim sector comprises a circumferential recess for receiving its respective ring portion.

8. The track system of claim 7, wherein each respective ring portion is formed within the circumferential recess using an overmolding process.

9. The track system of claim 6, wherein the rim defines a rim body, and an outer surface of the resiliently deformable tread extends radially outwardly from the rim body such that the outer surface of the resiliently deformable tread is unconfined by the rim body.

10. The track system of claim 9, wherein the rim body confines at least one of radial, lateral and circumferential movement of at least one of the ring portions when pressure is being exerted against the at least one of the ring portions from the resiliently deformable track.

11. The track system of claim 9, wherein the resiliently deformable ring is less rigid than the rim body.

12. The track system of claim 11, wherein the resiliently deformable tread is less rigid than the resiliently deformable ring.

13. The track system of claim 1, wherein the rated tension is between 10% and 20% of a gross weight of the vehicle.

14. The track system of claim 13, wherein the pressure exerted against the resiliently deformable tread is a first pressure, and when the resiliently deformable track is tensioned to the rated tension, the resiliently deformable track exerts a second pressure against at least one tooth of the plurality of teeth, the second pressure being less than the first pressure.

15. The track system of claim 14, wherein the second pressure is between 0% and 50% of the first pressure.

16. The track system of claim 12, wherein when the resiliently deformable track is tensioned to the rated tension, a distal end of at least one tooth of the plurality of teeth engages with a track-drive-surface between the drive lugs of the resiliently deformable track.

17. The track system of claim 1, wherein:
 the drive sprocket further comprises an inboard crown and an outboard crown,
 the rim includes an inboard rim and an outboard rim, and
 the inboard rim is connected to the inboard crown, and the outboard rim is connected to the outboard crown.

* * * * *